United States Patent
Myers

Patent Number: 5,136,007
Date of Patent: Aug. 4, 1992

[54] HIGH CHAR YIELD SILAZANE DERIVED PRECERAMIC POLYMERS AND CURED COMPOSITIONS THEREOF

[75] Inventor: Ronald E. Myers, Strongsville, Ohio

[73] Assignee: The B.F. Goodrich Company, Brecksville, Ohio

[21] Appl. No.: 447,931

[22] Filed: Dec. 8, 1989

[51] Int. Cl.$^5$ .............................................. C08G 77/06
[52] U.S. Cl. .................................... 528/21; 528/23; 528/24; 528/32; 528/33
[58] Field of Search ................... 528/33, 32, 24, 21, 528/23

[56] References Cited

U.S. PATENT DOCUMENTS

| | | | |
|---|---|---|---|
| 4,639,501 | 1/1987 | Seyferth et al. | 528/15 |
| 4,645,807 | 2/1987 | Seyferth et al. | 525/474 |
| 4,705,837 | 11/1987 | Seyferth et al. | 528/31 |
| 4,772,494 | 9/1988 | Porte et al. | 528/21 |
| 4,772,988 | 2/1988 | Porte et al. | 528/24 |

OTHER PUBLICATIONS

Journal of Polymer Science USSR vol. 23, pp. 1429–1438, 1981 authored by A. A. Zhdanov, G. V. Kotrelev, V. V. Kazakova and Y. L. Tolchinskii.

Organometallic Polymers As Precursors to Ceramic Materials: Silicon Nitride and Silicon Oxynitride by Richard M. Laine, Yigal D. Blum, Richard D. Hamlin and Andrea Chow.

Ultrastructure Processing of Advanced Ceramics, John Wiley & Sons, pp. 761–769, 1988, NY, NY.

Effects of Molecular Weight and Cross-Linking on Two Preceramic Polymers by Wm. Toreki and Christopher D. Batich.

Primary Examiner—Melvyn I. Marquis
Attorney, Agent, or Firm—Daniel J. Hudak; Robin S. Levine; Nestor W. Shust

[57] ABSTRACT

Novel polysiloxane-silazane preceramic polymer compositions are prepared by the controlled hydrolysis polymerization of a trimer or tetramer of a monomer of the structure

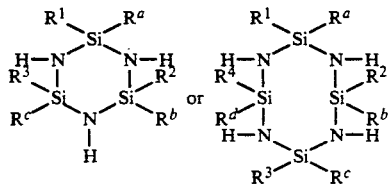

wherein $R^1$, $R^2$, $R^3$, and $R^4$ are independently alkyl groups containing from 1 to 4 carbon atoms, $R^a$, $R^b$, $R^c$, and $R^d$ are independently alkenyl or alkyl groups containing from 2 to 6 carbon atoms with the proviso that at least one of $R^a$, $R^b$, $R^c$, or $R^d$ group is an alkenyl group. The polysiloxane-silazane polymers are cured by heat and optionally free radical initiators such as various peroxides. The cured preceramic polymers so formed can be used in the pyrolyzed or non-pyrolyzed state as adhesives, coatings, binders, fibers, matrix resins, and the like.

41 Claims, 2 Drawing Sheets

HIGH CHAR YIELD SILAZANE DERIVED PRECERAMIC POLYMERS AND CURED COMPOSITIONS THEREOF

FIELD OF THE INVENTION

The present invention relates to compositions which are useful as preceramic polymers as well as to cured compositions thereof.

The present invention describes the synthesis and characterization of organosilazane-derived preceramic polymers. The hydrolytic polycondensation of organo cyclic silazanes provides a high yield route to organic-soluble polysilazoxanes. Cure is effected by heating the polysilazoxanes at high temperatures such as in excess of 200° C., or at generally lower temperatures through the use of free radical initiators. Pyrolysis of the polysilazoxane resins under an inert atmosphere (such as argon) results in the formation of glassy, refractory chars consisting primarily of SiC, $SiO_2$ and carbon. Pyrolysis of the polysilazoxane resins under a reactive atmosphere condition (such as ammonia) results in the formation of glassy, refractory chars consisting primarily of SiC, $SiO_2$, carbon, $Si_3N_4$, and $Si_2ON_2$. The polysilazoxane resins produce char yields of about 60 to about 85 weight percent at temperatures of 1500° C. or less.

BACKGROUND

U.S. Pat. No. 4,639,501 to Seyferth et al relates to a process for preparing preceramic polymers containing silicon, carbon and other elements, and for their pyrolysis to ceramic materials.

U.S. Pat. No. 4,645,807 to Seyferth et al relates to a process for preparing organosilicon preceramic polymers useful for making silicon carbide, SiC, and silicon nitride/silicon carbide, $Si_3N_4$/SiC, ceramics and for their pyrolysis to ceramic material.

U.S. Pat. No. 4,705,837 to Seyferth et al relates to a process for preparing silicon-containing preceramic polymers useful for making silicon oxynitride, silicon carbide, and silicon nitride/silicon carbide, ceramics and for their pyrolysis to such ceramic materials.

In a Journal of Polymer Science USSR Vol. 23, pg. 1429-1438, 1981, authored by A. A. Zhdanov, G. V. Kotrelev, V. V. Kazakova and Y. L. Tolchinskii, the catalytic polycondensation of organosilazanes is discussed. The catalytic polycondensation of organosilazanes (Andrianov reaction) was carried out using dimethylcyclosilazanes. The reaction takes place with preferential formation of hydrocarbons and some ammonia and results in polycyclic oligomeric products or polymers whose molecular structure contains a trisilyl-substituted nitrogen atom. The polycondensation of trimethyltriphenyl-cyclotrisilazane and trimethyltrivinylcyclotrisilazane occurs in the presence of KOH, alkali metals and their organodisilyamides.

A paper titled "Organometallic Polymers as Precursors to Ceramic Materials: Silicon Nitride and Silicon Oxynitride" by Richard M. Laine, Yigal D. Blum, Richard D. Hamlin and Andrea Chow, "Ultrastructure Processing of Advanced Ceramics," John Wiley & Sons, pages 761-769, 1988, N.Y., N.Y. discusses the synthesis and pyrolysis of polysilazanes and polysilazoxanes.

SUMMARY OF THE INVENTION

This invention is directed to a polysilazoxane preceramic polymer composition prepared by the controlled hydrolysis polymerization of a trimer or tetramer of a monomer of the structure wherein $R^1$, $R^2$, $R^3$, and $R^4$ are independently alkyl groups containing from 1 to 4 carbon atoms, $R^a$, $R^b$, $R^c$, and $R^d$ are independently alkenyl or alkyl groups containing from 2 to 6 carbon atoms with the proviso that at least one of $R^a$, $R^b$, $R^c$, or $R^d$ group is an alkenyl group.

DETAILED DESCRIPTION OF THE INVENTION

The polysilazoxane preceramic polymer compositions of the present invention are prepared by a controlled hydrolysis polymerization of a cyclic silicon-nitrogen monomer in the presence of water and optionally a dual initiator system.

The cyclic silicon-nitrogen monomer is represented by the structure wherein $R^1$, $R^2$, $R^3$, and $R^4$ are independently alkyl groups containing from 1 to 4 carbon atoms, and preferably 1 to 2 carbon atoms. $R^a$, $R^b$, $R^c$, and $R^d$ are independently alkenyl or alkyl groups containing from 2 to 6 carbon atoms, preferably 2 to 4 carbon atoms, and most preferably 2 to 3 carbon atoms, with the proviso that at least one of $R^a$, $R^b$, $R^c$, and $R^d$ is an alkenyl group.

Within the alkenyl group the double bond may be terminal such as vinyl (—CH=$CH_2$), allyl (—$CH_2$CH=$CH_2$), 1-butenyl (—$CH_2CH_2$CH=$CH_2$), 1-pentenyl (—$CH_2CH_2CH_2$CH=$CH_2$), and 1-hexenyl (—$CH_2CH_2CH_2CH_2$CH=$CH_2$). The double bond may also be internal. Representative examples of the latter are 2-butenyl (—$CH_2$CH=$CHCH_3$) and 3-pentenyl (—$CH_2$CH=$CHCH_2CH_3$). Additionally, the carbon atoms may be branched such as 3-methyl-1-butenyl

2,3-dimethyl-1-butenyl and 3,3-dimethyl-1-butenyl

In the preferred embodiment within the trimer $R^1=R^2=R^3=$methyl and $R^a=R^b=R^c=$vinyl giving the structure (1,3,5-trimethyl-1,3,5-trivinylcyclotrisilazane) abbreviated as TMTVTS, and is commercially available from Petrarch Systems.

The degree to which the hydrolysis of silicon-nitrogen compounds proceeds is influenced by the nature of the solvent system (homogeneous versus heterogeneous conditions), the pH of the solution, the reaction temperature, and the types of substituents on the silicon/nitrogen atoms (steric/electronic effects).

In the present application, the hydrolytic instability of TMTVTS has been used to advantage as the basis for a synthetic route to preceramic polymers. Thus, it has been found that the hydrolysis of TMTVTS proceeds with evolution of ammonia and the formation of a silazoxane polymer. The resulting polymer is soluble in THF, toluene and dichloromethane. The polymer was characterized by infrared spectroscopy, NMR, gel permeation chromatography, thermal gravimetric analysis and elemental analysis Pyrolysis products were characterized by elemental analysis and x-ray diffraction.

One embodiment of this invention is that the controlled hydrolysis of the monomer is carried out in the presence of initiators, specifically a dual initiator system. Attempts were made at polymerizing TMTVTS using free radical initiators such as azobisisobutyronitrile (AIBN) or benzoylperoxide. Using these initiators TMTVTS was recovered unchanged. The controlled hydrolysis of the monomer can be effected by utilizing a dual initiator system of an aqueous persulfate/thiosulfate catalyst system. The Group I persulfate/Group I thiosulfate initiators are present in a mole ratio of from 1:0.85 to 0.85:1, preferably 1:0.95 to 0.95:1, and most preferably 1:1.

The controlled hydrolysis of the monomer can be effected by utilizing a dual initiator system of an aqueous Group I metal persulfate/Group I metal thiosulfate catalyst system. Group I metals having utility as the persulfate/thiosulfate salts are lithium, sodium and potassium. In the practice of this embodiment, the initiator system may be potassium persulfate with potassium thiosulfate, sodium persulfate with sodium thiosulfate, potassium persulfate with sodium thiosulfate or sodium persulfate with potassium thiosulfate. Lithium may be substituted with sodium or potassium or may be used in addition to sodium and/or potassium. The dual initiator system takes its name from the fact that there is at least one persulfate and at least one thiosulfate. In practicing this embodiment, a persulfate salt mixture of lithium, sodium, and potassium may be utilized along with a thiosulfate salt mixture of lithium, sodium and potassium.

In order to effect the controlled hydrolysis, the water:initiator mole ratio is from 150:1 to 400:1, preferably 200:1 to 300:1, and most preferably 200:1 to 250:1, and the water:monomer mole ratio is from 1.5:1 to 4:1, preferably 2:1 to 3:1, and most preferably 2:1 to 2.5:1.

Another embodiment of this invention is that the controlled hydrolysis of the monomer is carried out in the presence of water, that is, in the absence of an initiator system. In this embodiment, the water:monomer mole ratio is from 1.5:1 to 20:1, preferably 2:1 to 10:1 and most preferably 2:1 to 7.5:1.

Under either embodiment, in order for the polymerization to begin, heat is applied. Generally the reaction temperature is from about 100° C. to about 190° C. and preferably from about 130° C. to about 150° C. Ammonia is evolved during the reaction. Generally, temperatures in excess of those noted are avoided inasmuch as they tend to produce an intractable product. Inasmuch as the polymerization is only slightly exothermic, heat must be applied thereto. The polymerization is generally a hydrolytic condensation polymerization with some ring opening occurring. The number average molecular weight ($M_n$) of the formed polymer is at least about 3,000 and desirably from about 10,000 to about 100,000. Generally, it appears that the length of time of polymerization and the water:monomer mole ratio often is directly proportional to the amount of siloxane units produced. The amount of siloxane in the end polymer is generally from about 65 percent to about 98 percent, preferably from 80 percent to about 98 percent, and most preferably from 85 percent to about 98 percent by weight with the balance being silazane. Some silazane groups, within the polymer structure, are always desirable inasmuch as they are easily charred and yield better char properties.

On the basis of IR spectroscopy, NMR and elemental analysis, the polymethylvinylsilazoxane (PMVS) produced from the hydrolysis of TMTVTS is believed to have the following formulation (Formula I):

The values of x (siloxane content) and y (silazane content) in the above formulation will, of course, vary as a function of the extent of hydrolysis. The x and y components together make up the polysilazoxane. The end polymer, which is a combination of siloxane as well as silazane units, is generally a random copolymer. The above structure is not meant to imply that the polysilazoxane is exclusively linear. Some cyclic and branched moieties may also be present within the polysilazoxane.

The preceramic polymer compositions of this invention have utility either in the pyrolyzed or non-pyrolyzed state. Within the pyrolyzed state, the preceramic polymer compositions have utility as resins, binders, coatings, and adhesives for high temperature ceramics and/or ceramic composites.

In the non-pyrolyzed state, the polymeric composition of this invention has utility in the area of high temperature coatings such as adhesives, caulks, and sealants, either per se or as one of several components. Other uses for the non-pyrolyzed composition are high temperature resin matrix polymers. These non-pyrolyzed polymers would be used as a matrix resin in combination with reinforcement wherein these reinforcements include fibers, whiskers, particulates, and combinations thereof. A composite of the polymer and the reinforcement could be made by conventional polymer processing methods.

Applications for these polymer compositions include, among others:

1. formation into complex shapes and subsequent pyrolysis to give a ceramic material of the same shape;
2. spinning into continuous or discontinuous fibers whose subsequent pyrolysis yields ceramic fibers;
3. spinning into continuous or discontinuous fibers without pyrolysis to yield polymer fibers;
4. as a matrix material for carbon or ceramic fibers, or other reinforcements (with or without subsequent pyrolysis);
5. as a binder for ceramic powders (with subsequent pyrolysis to form a ceramic body);
6. infiltration of porous ceramic bodies, such as sintered silicon nitride, by the polymer itself (if liquid) or by a solution of the polymer, with subsequent pyrolysis to form a ceramic, resulting in better strength, oxidation resistance, etc., of the body.

The following examples are illustrative of the preparation of the polysilazoxane preceramic polymers of the present invention. Unless otherwise indicated, all parts and percentages are by weight.

EXAMPLE 1

TMTVTS (122.34 g, 0.48 mole) was placed in a 500 mL three-neck, round bottom flask equipped with thermometer, reflux condenser, blade stirrer and addition funnel. An aqueous persulfate/thiosulfate dual initiator solution [0.38 g (0.0024 mole) $Na_2S_2O_3$ and 0.65 g (0.0024 mole) $K_2S_2O_8$ dissolved in 19.8 mL (1.1 mole) water] was then added dropwise to the TMTVTS with rapid stirring under a nitrogen blanket. The reaction mixture was then heated at 130° C. for 10 hours/$N_2$. During the initial stage of the reaction, it was necessary to use a slow rate of heating (two hours to reach 130° C.) in order to control foaming due to ammonia evolution. The reaction mixture was then cooled to 22° C., and the resulting pale yellow, viscous liquid was dissolved in 250 mL of dichloromethane; the polymer solution was then dried over $CaSO_4$ for 16 hours. After filtering to remove the $CaSO_4$, the polymer solution was freed of dichloromethane by rotary evaporation (70° C., water aspirator). After vacuum drying (60° C./3 hours), polymethylvinylsilazoxane (PMVS) was obtained as a pale yellow, viscous liquid; yield 107 g. PMVS is soluble in dichloromethane, THF and toluene. The resulting PMVS has a molecular weight $M_n=42,100$ and $M_w=89,400$. Elemental analyses (in weight percent): carbon—41.97, hydrogen 7.27, nitrogen—3.33, silicon—29.65, and oxygen (by difference)—17.78.

EXAMPLE 2

The procedure of Example 1 was followed except that the reaction time was increased from 10 hours to 16.5 hours. The resulting PMVS had a molecular weight $M_n=51,700$ and $M_w=132,000$.

EXAMPLE 3

The procedure of Example 1 was followed except that the reaction time was increased from 10 hours to 20 hours. The resulting PMVS had a molecular weight $M_n=87,000$ and $M_w=334,000$.

EXAMPLE 4

The procedure of Example 1 was followed except that half the level of both water and TMTVTS were utilized, 0.55 moles and 0.24 moles, respectively, and the reaction time was 8.5 hours. The resulting PMVS had a molecular weight $M_n=59,500$ and $M_w=181,500$.

EXAMPLE 5

TMTVTS (25 g; 0.098 mole) was placed in a 100 mL round bottom flask equipped with thermometer, reflux condenser and magnetic stir bar. An aqueous persulfate/thiosulfate initiator solution [0.229 g (0.00145 mole) $Na_2S_2O_3$ and 0.392 g (0.00145 mole) $K_2S_2O_8$ dissolved in 12 mL (0.667 mole) water] was then added in one portion to the TMTVTS with rapid stirring under a nitrogen blanket. The reaction mixture was heated to 78° C. over a period of two hours during which time ammonia evolved from the system. The reaction temperature was then raised to 95° C. and held there for an additional 96 hours. The resulting colorless, low viscosity liquid was then cooled to 22° C. and dissolved in 175 mL of dichloromethane. The remaining workup procedure for this sample was identical to that described in Example 1. A yield of 23.6 g of PMVS was obtained. The resulting PMVS had a molecular weight $M_n=3100$ and $M_w=5600$.

Example 6 shown below illustrates the hydrolysis of TMTVTS under non-inventive parameters, i.e., using a water:monomer mole ratio of 1:1. No catalyst was used.

EXAMPLE 6

Water (1.76 mL; 0.098 mole) was added in one portion to 25 g (0.098 mole) of TMTVTS. The reaction mixture was slowly heated to 118° C. over a period of 3 hours (under nitrogen) during which time ammonia evolved from the system. The reaction temperature was then raised to 130°-140° C. and held there for an additional 18.5 hours. The resulting colorless low viscosity liquid was then cooled to 22° C. and dissolved in 100 mL of dichloromethane. The remaining workup procedure for this sample was identical to that described in Example 1. A yield of 21.78 g of PMVS was obtained. Moreover, a char yield of only 33 percent by weight was obtained.

The following examples are directed to the formation of PMVS from TMTVTS but without using any initiators. The water:monomer mole ratio is between 1.5:1 to 20:1.

EXAMPLE 7

Figure 1:
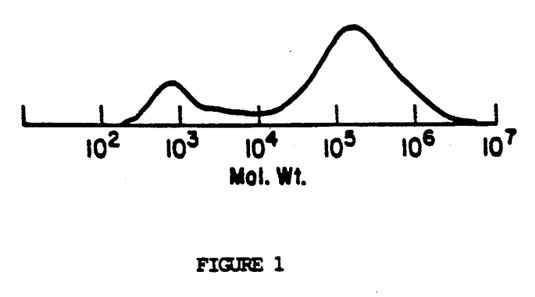
FIG. 1 is a representative molecular weight profile for polymethylvinylsilazoxane (gel permeation chromatography; polystyrene calibration standards)

Water (4 mL; 0.22 mole) was added in one portion to 25 g (0.098 mole) of TMTVTS. The reaction mixture was heated at 140° C. under $N_2$ for 20 hours, and the resulting clear, colorless, viscous liquid was dissolved in 100 mL of dichloromethane. The remaining workup procedure for this sample was identical to that described in Example 1. A yield of 20.4 g of PMVS was obtained. Elemental analyses (by weight percent): carbon—41.62, hydrogen—7.30, nitrogen—1.79 silicon—30.96, and oxygen (by difference)—18.33. The resulting PMVS had a molecular weight $M_n = 78,500$ and $M_w = 317,000$.

these examples ranges from $M_w = 5,600$ to 334,000 Daltons and $M_n = 3,100$ to 87,000 Daltons.

In general, the GPC data indicate that the molecular weight of PMVS often is directly proportional to the reaction time. As shown in Table I, the $M_n$ values for Example 1 ($M_n = 42,100$), Example 2 ($M_n = 51,700$, and Example 3 ($M_n = 87,000$) correspond to reaction times of 10 hrs., 16.5 hrs., and 20 hrs., respectively.

TABLE I

| Hydrolytic Polycondensation of TMTVTS | | | | | | | | | |
|---|---|---|---|---|---|---|---|---|---|
| | EX. 1 | EX. 2 | EX. 3 | EX. 4 | EX. 5 | EX. 6 | EX. 7 | EX. 8 | EX. 9 |
| $H_2O$:Monomer Mole Ratio | 2.29:1 | 2.29:1 | 2.29:1 | 2.29:1 | 6.8:1 | 1:1 | 2.24:1 | 6.8:1 | 20:1 |
| Persulfate:Thiosulfate Mole Ratio | 1:1 | 1:1 | 1:1 | 1:1 | 1:1 | 0:0 | 0:0 | 0:0 | 0:0 |
| Reaction Time (hrs.) | 10 | 16.5 | 20 | 8.5 | 98 | 21.5 | 20 | 102 | 23 |
| Molecular Weight | | | | | | | | | |
| $M_n$ | 42,100 | 51,700 | 87,000 | 59,500 | 3100 | — | 78,500 | 29,900 | 3480 |
| $M_w$ | 89,400 | 132,000 | 334,000 | 181,500 | 5600 | — | 89,400 | 49,900 | 5770 |

EXAMPLE 8

Water (12 mL; 0.667) mole) was added in one portion to 25 g (0.098 mole) of TMTVTS. The reaction mixture was slowly heated to 90° C. over a period of six hours (under nitrogen) during which time ammonia evolved from the reaction mixture The reaction temperature was then raised to 100°-105° C. and held there for an additional 96 hours. The resulting colorless, moderately viscous liquid was then cooled to 22° C. and dissolved in 100 mL of dichloromethane. The remaining workup procedure for this sample was identical to that described in Example 1. A yield of 21.3 g of PMVS was obtained. The resulting PMVS had a molecular weight $M_n = 29,900$ and $M_w = 49,900$.

EXAMPLE 9

Water (35.3 mL; 1.96 mole) was added in one portion to 25 g (0.098 mole) of TMTVTS. The reaction mixture was slowly heated to 80° C. over a period of 4 hours (under nitrogen) during which time ammonia evolved from the reaction mixture. The reaction temperature was then raised to 95°-100° C. and held there for an additional 19 hours. The resulting clear, colorless, low viscosity liquid was then cooled to 22° C. and dissolved in 200 mL of dichloromethane. The remaining workup procedure for this sample was identical to that described in Example 1. A yield of 22.65 g of PMVS was obtained. The resulting PMVS had a molecular weight $M_n = 3480$ and $M_w = 5770$.

Gel permeation chromatography (GPC), using polystyrene calibration standards, was used to determine molecular weights of the PMVS samples. Each of the PMVS samples, irrespective of reaction conditions used in the preparation of the polymer, showed a bimodal molecular weight distribution. A representative molecular weight profile for PMVS is shown in FIG. 1. Referring to Table I, the high molecular weight fraction of

Thermal Analysis

Thermal stabilities and char yields of the PMVS samples were determined by using thermal gravimetric analysis (TGA). As shown in Table II, the products of Examples 1, 2, 4, 5, 7, 8, and 9 exhibit substantial char yields at temperatures as high as 1500° C.; 60 to 76 weight percent char when heated in flowing $N_2$ and 70 to 85 weight percent char when heated in flowing air.

TABLE II

| Thermal Analysis (TGA of PMVS) | | | | | | | | |
|---|---|---|---|---|---|---|---|---|
| | EX. 1 | EX. 2 | EX. 4 | EX. 5 | EX. 6 | EX. 7 | EX. 8 | EX. 9 |
| Temp. (°C.) of Initial Weight Loss in $N_2$ | 150 | 200 | 150 | 325 | 150 | 300 | 200 | 200 |
| Weight % Char at 1500° C. in: | | | | | | | | |
| $N_2$ | 60 | 62 | 65 | 76 | 33 | 65 | 76 | 68 |
| Dry Air | 70 | — | 80 | 84 | — | 80 | 85 | 77 |

Figure 2:
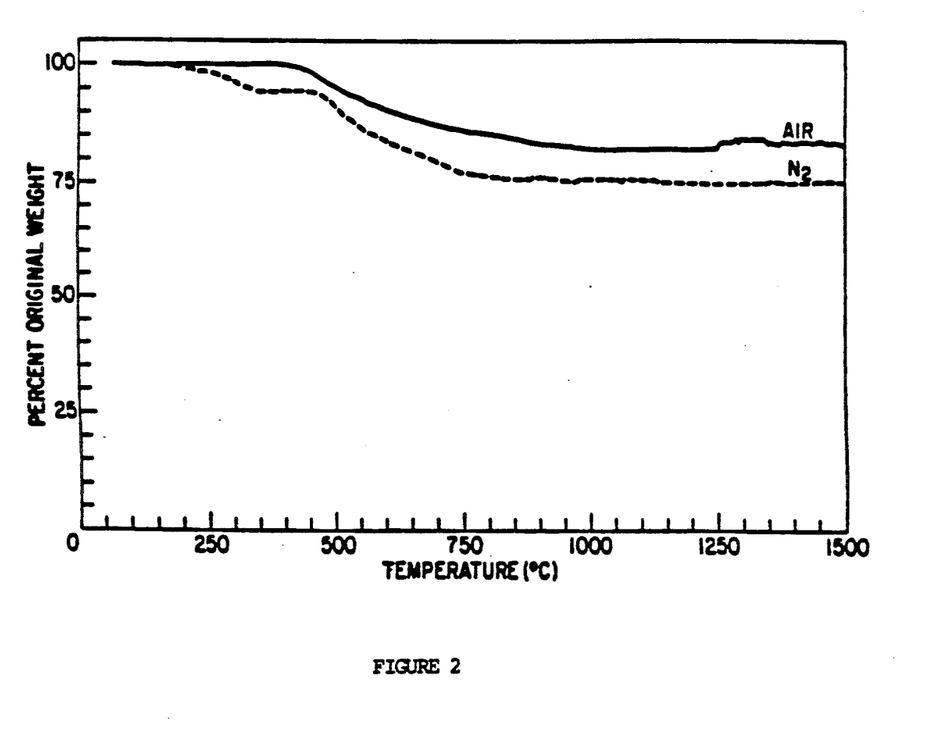
FIG. 2 is representative TGA profiles for polymethylvinylsilazoxane in dry air (solid curve) and in $N_2$ (broken curve), with a 10° C. per minute heating rate.
Figure 3:
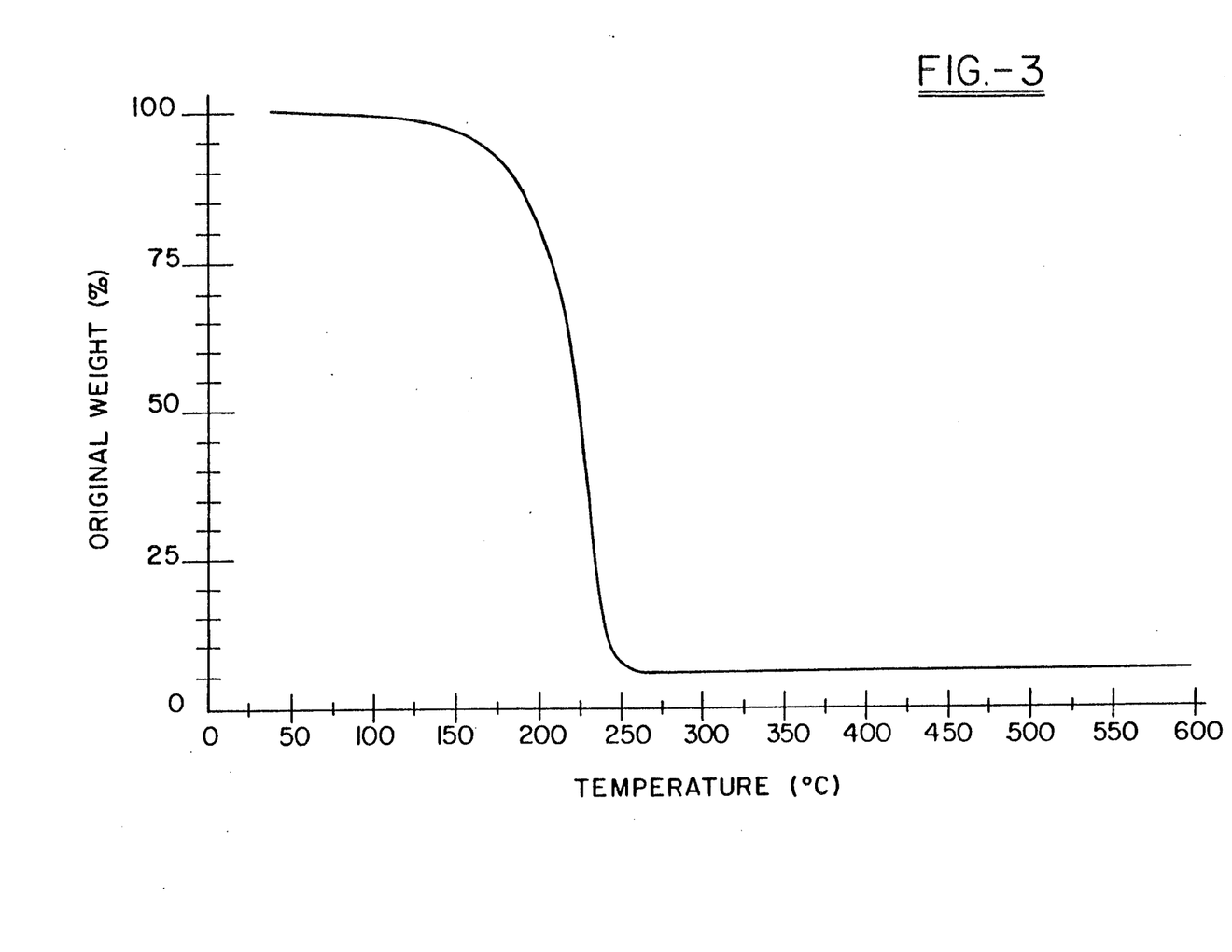
FIG. 3 is TGA profile for trimethyltrivinylcyclotrisilazane run in $N_2$.

A representative TGA profile for PMVS is shown in FIG. 2. Onset of weight loss for this sample occurs at 200° C. in $N_2$ and at 400° C. in air. At temperatures in excess of 750°-900° C., the PMVS sample essentially show no further change in weight. It is also apparent from FIG. 2 (and is generally found for each of the PMVS samples) that these polysilazoxanes, under the conditions of the TGA run, show a higher char yield in air than in $N_2$. The higher char yields observed under oxidizing conditions may be due to: (1) enhanced formation of $SiO_2$ and/or (2) free radical-induced crosslinking reactions involving the Si—CH=CH$_2$ groups in the polymer.

In general, the char yields (of 60 to 85 percent) obtained in Examples 1, 2, 4, 5 and 7-9 are quite high. These silazoxane polymers are organic soluble liquids which physically resemble linear polysiloxanes. And as previously indicated (in Formula I), the predominant structural component of the PMVS resins is that of a siloxane. However, most simple, linear polysiloxanes (even those having high molecular weights) have a tendency to depolymerize during inert atmosphere pyrolysis. This depolymerization process leads to the formation of low molecular weight cyclosiloxanes (trimers, tetramers, etc.) which volatilize, resulting in low char yields. For example, high molecular weight ($M_n = 450,000$, linear polydimethylsiloxanes have a char yield of less than 5 percent at 400° C. in $N_2$.

The high thermal stability of the PMVS resins cannot be attributed to the strength of the silazane bond, which is about 30 kcal/mole lower than that of the siloxane (Si—O) bond. Indeed, many simple polysilazanes show poor thermal stability. For example, polydimethylsilazane has essentially zero char yield as a result of depolymerization reactions which occur during pyrolysis.

According to another embodiment of the present invention, the above-noted polysilazoxane polymers can be readily cured to form a crosslinked polymer network or matrix. Curing is generally accomplished either by merely applying high heat to the polysilazoxane polymers or, optionally, utilizing a free radical initiator at generally a lower temperature. In order to cause the various polysilazoxanes to crosslink, they must be heated to at least a temperature of about 200° C., and generally from about 200° to about 300° C., desirably from about 225° to about 300° C., and preferably from about 250° to about 300° C.

As an optional alternative to the application of high cure temperatures, free radical initiators can be utilized such as the various peroxides, the various azos, and the like. The initiators generally provide cure at much lower temperatures and, hence, cure of the various polysilazoxanes can be effected generally at temperatures below 250° or 225° C., generally at a temperature of from about 40° to about 200° C., desirably from about 45° to about 180° C., and preferably from about 65° to about 130° C. The time to effect cure will generally vary with the thickness of the end product or article, and for a 1 to 3 mil thickness, it is generally from about 5 to about 15 minutes.

Examples of peroxides which can be utilized as free radical initiators include cumene hydroperoxide, benzoyl peroxide, diacetyl peroxide, dodecanoyl peroxide, di-t-butyl peroxide, dilauroyl peroxide, bis(p-methoxy benzoyl) peroxide, t-butyl peroxy pivalate, dicumyl peroxide, lauryl peroxide, methyl ethyl ketone peroxide, diisopropylbenzene hydroperoxide, 2,4-dichlorobenzoyl peroxide, naphthoyl peroxide, di-t-butyl perphthalate, isopropyl percarbonate, acetyl cyclohexane sulfonyl peroxide, and the like, with benzoyl peroxide, dicumyl peroxide, and t-butyl peroxide being preferred. In lieu of the peroxide initiators, or in combination therewith, various azo free radical initiators can also be utilized. Examples of suitable azo initiators include azobisisobutyronitrile (AIBN), alpha, alpha'-azodiisobutyrate, 2,2'-azo-bis-(2,4-dimethyl valeronitrile), and the like, with AIBN being preferred. The total amount of initiators is generally from about 0.1 to about 10 percent by weight, desirably about 0.1 to about 6 percent by weight, and preferably from about 0.1 to about 3 percent by weight based upon the total weight of the various polysilazoxane polymers.

Curing of the polymers can occur either in bulk or in a solvent solution. That is, any solvent can be utilized which does not enter into any reaction with the polysilazoxane polymers and which dissolve the polymers. Any hydrocarbon solvent can generally be utilized such as an aromatic, an aliphatic, or combinations thereof, generally having from about 6 to about 18 carbon atoms with specific examples including toluene, xylene, mineral spirits, hexane, 1-methyl-2-pyrrolidinone, and the like. An effective amount of solvent is utilized such that the polysilazoxane polymers are put into solution, that is, dissolved. The exact amount of solvent will vary depending upon the type of solvent and can be very little, such as from approximately 50 parts by weight of solvent, to several times the amount of solvent, that is, 300–400 parts, and even in excess of 1,000 parts per 100 parts by weight of polymer. When solvents are utilized, the polymers are simply added thereto and the resulting composition mixed. Heat, or heat and the above noted free radical initiators, is then applied to the composition to effect cure or crosslinking of the polymers. Cure can take place in air or in an inert atmosphere such as argon or nitrogen.

As noted above, various fibers such as ceramic, boron, carbon, glass, aramid i.e. aromatic nylon fibers, and the like, can be incorporated into the polysilazoxane polymers with the polymers subsequently being cured. The incorporation of various fibers add structural integrity and strength to the cured polymer, and often high temperature performance and oxidation resistance. The amount of fibers can vary greatly, as from about 10 to about 80 percent, and desirably from about 40 to about 80 percent by volume based upon the total volume of the various polysilazoxane polymers and the fibers.

The cured polysilazoxane polymers can be used as adhesives, binders, coatings, fibers, matrix resins, and the like, as well as for ceramic objects. Cured polymers can be utilized in the pyrolyzed or in the unpyrolyzed state. The cure of polysilazoxane polymers will be better understood by reference to the following examples.

EXAMPLE 10

Reaction of a Polysilazoxane with AIBN

A sample similar to the Example 8 polymer was dissolved in 20 ml of toluene. AIBN (0.15 g) was added to the similar Example 8 solution, and the reaction mixture was heated to 70°–75° C. under a $N_2$ atmosphere. After a reaction time of 18 hours, the noted solution was converted to a clear, colorless, insoluble material in near quantitative yield (4.8 g). The cured polymer was vacuum dried at 70° C./2 hours. The resulting polymer had good thermal stability, in fact, better than that of the uncured similar Example 8 solution.

TABLE III

| TGA DATA TO 1500° C./$N_2$ (10° C./MIN. HEATING RATE) | | |
|---|---|---|
| | Temp. of Initial wt. loss/$N_2$ | wt. % char at 1500° C. |
| Cured polysilazoxane of Example 10 | 450° C. | 80.4% |
| Uncured polysilazoxane similar to Example 8 | 200° C. | 75.9% |

The reaction of the polysilazoxane similar to that of Example 8 with AIBN was unexpected inasmuch as the silazane monomer from which the product of a composition similar to Example 8 is synthesized, that is, TMTVTS, is unreacted with AIBN. That is, when TMTVTS was heated in the presence of AIBN (either in bulk or in a toluene solution) for times of from 70 to 100 hours at 70° C., the TMTVTS was recovered unchanged. Since AIBN is known to be reactive toward vinyl groups, it was unexpected that AIBN would react only with the polysilazoxane product which is similar to that of Example 8.

EXAMPLE 11

Reaction of Polysilazoxane of Example 2 with Benzoyl Peroxide

A sample of the polysilazoxane of Example 2 was dissolved in 20 ml of toluene. Benzoyl peroxide (0.3 g)

was added to this solution, and the reaction mixture was heated to 65°–70° C. for 1 hour under a $N_2$ atmosphere. The originally soluble polysilazoxane of Example 2 was converted to an insoluble material. After vacuum drying at 70° C./2 hrs., a yield of 4.5 g of cured polysilazoxane of Example 2 was obtained.

TABLE IV

| TGA DATA TO 1500° C./$N_2$ (10° C./MIN. HEATING RATE) | | |
|---|---|---|
| | Temp. of Initial wt. loss | wt. % char at 1500° C. |
| Cured polysilazoxane of Example 11 | 225° C. | 75% |
| Uncured polysilazoxane of Example 2 | 200° C. | 62% |

EXAMPLE 12

Thermal Curing of Polysilazoxane of Example 2

A sample of the polysilazoxane of Example 2 was poured onto a glass plate and was heated in air on the hot stage of a melting point apparatus. The 1 mil thick polysilazoxane of Example 2 was converted to a hard, cured coating within 5 minutes at 250° C. The cured polysilazoxane of Example 2 was then tested for solubility by immersion in toluene at 25° C. for 12 hours. No weight loss of the polysilazoxane of Example 2 was observed following this treatment.

As apparent from the above example, high temperature heat alone was found to cure the polysilazoxane polymers.

The cured polysilazoxane polymers of the present invention are useful as impregnants, coatings, adhesives, binders, fibers, matrix resins, and the like, as well as for making ceramic articles. The cured polymers can also be utilized in an unpyrolyzed as well as pyrolyzed state.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising a polysilazoxane, wherein said polysilazoxane includes both siloxane and silazane moieties which is prepared by the condensation polymerization of a monomer of wherein $R^1$, $R^2$, $R^3$, and $R^4$ are independently alkyl groups containing from 1 to 4 carbon atoms, $R^a$, $R^b$, $R^c$, and $R^d$ are independently alkenyl or alkyl groups containing from 2 to 6 carbon atoms with the proviso that at least one of $R^a$, $R^b$, $R^c$, or $R^d$ group is an alkenyl group, wherein said polymerization proceeds by a hydrolytic polycondensation reaction in the presence or absence of a dual initiator system, wherein said dual initiator contains at least one persulfate and at least one thiosulfate.

2. The composition of claim 1, wherein the siloxane:silazane moieties of the polymer are in a weight ratio of at least 65:35.

3. The composition of claim 2, wherein the number average molecular weight (Mn) of the polysilazoxane is at least about 3,000.

4. The composition of claim 3, wherein $R^1$, $R^2$, $R^3$, and $R^4$ are independently alkyl groups containing from 1 to 2 carbon atoms.

5. The composition of claim 4, wherein $R^a$, $R^b$, $R^c$, and $R^d$ are independently alkyl or alkenyl groups containing from 2 to 4 carbon atoms.

6. The composition of claim 5, wherein $R^a$, $R^b$, $R^c$, and $R^d$ are independently alkyl or alkenyl groups containing from 2 to 3 carbon atoms.

7. The composition of claim 1, wherein the polymerization occurs by hydrolytic polycondensation of the monomer in the presence of a dual initiator system, wherein said dual initiator contains at least one persulfate and at least one thiosulfate.

8. The composition of claim 7, wherein the water:monomer mole ratio is from about 1.5:1 to about 20:1.

9. A composition comprising a polysilazoxane, wherein said polysilazoxane includes both siloxane and silazane moieties which is prepared by the polymerization of a monomer of wherein $R^1$, $R^2$, $R^3$, and $R^4$ are independently alkyl groups containing from 1 to 4 carbon atoms, $R^a$, $R^b$, $R^c$, $R^d$ are independently alkenyl or alkyl groups containing from 2 to 6 carbon atoms with the proviso that at least one of $R^a$, $R^b$, $R^c$, or $R^d$ group is an alkenyl group, wherein said polymerization occurs by hydrolysis comprising an aqueous system of dual initiators, wherein said polymerization occurs by a hydrolytic polycondensation reaction in the presence or absence of a dual initiator system, wherein said dual initiator contains at least one persulfate and at least one thiosulfate.

10. The composition of claim 9, wherein the siloxane:silazane moieties of the polymer are in a weight ratio of at least 65:35.

11. The composition of claim 10, wherein the number average molecular weight (Mn) of the polymer is at least about 3,000.

12. The composition of claim 11, wherein $R^1$, $R^2$, $R^3$, and $R^4$ are independently alkyl groups containing from 1 to 2 carbon atoms.

13. The composition of claim 12, wherein $R^a$, $R^b$, $R^c$, and $R^d$ are independently alkyl or alkenyl groups containing from 2 to 4 carbon atoms.

14. The composition of claim 13, wherein $R^a$, $R^b$, $R^c$, and $R^d$ are independently alkyl or alkenyl groups containing from 2 to 3 carbon atoms.

15. The composition of claim 14, wherein said dual initiators are persulfate/thiosulfate.

16. The composition of claim 15, wherein said persulfate/thiosulfate initiators are present in a mole ratio of from 1:0.85 to 0.85:1.

17. The composition of claim 16, wherein the water-:initiator mole ratio is from 150:1 to 400:1.

18. The composition of claim 17, wherein the water:-monomer mole ratio is from 1.5:1 to 4:1.

19. A composition comprising a polysiloxane-silazane prepared by polymerization of a monomer wherein said polymerization occurs by hydrolysis of the monomer, wherein said polymerization occurs by a hydrolysis reaction in the presence or absence of a dual initiator system, wherein said dual initiator contains at least one persulfate and at least one thiosulfate.

20. The composition of claim 19, wherein the siloxane-silazane moieties of the polymer are in a weight ratio of at least 84:16.

21. The composition of claim 20, wherein the number average molecular weight of the polymer is at least about 3,000.

22. The composition of claim 21, wherein said hydrolytic polycondensation proceeds in the absence of a dual initiator system.

23. The composition of claim 21, wherein said dual initiators are persulfate/thiosulfate.

24. The composition of claim 23, wherein said aqueous persulfate/thiosulfate initiators are present in a mole ratio of 1:1.

25. The composition of claim 24, wherein the water-:initiator mole ratio is from about 200:1 to about 250:1.

26. The composition of claim 25, wherein the water:-monomer weight ratio is from about 2:1 to about 2.5:1.

27. A cured polysilazoxane composition, comprising: polysiloxane polymers cured by heat and optionally by free radical initiators, said polysilazoxane polymers prepared by the condensation polymerization of wherein $R^1$, $R^2$, $R^3$, and $R^4$ are independently alkyl groups containing from 1 to 4 carbon atoms, $R^a$, $R^b$, $R^c$, and $R^d$ are independently alkenyl or alkyl groups containing from 2 to 6 carbon atoms with the proviso that at least one of $R^a$, $R^b$, $R^c$, or $R^d$ group is an alkenyl group, wherein the heat curing temperature and the initiator curing temperature are effective temperature to crosslink said polysiloxane polymers, wherein said polymerization proceeds by a hydrolysis reaction in the presence or absence of a dual initiator system, wherein said dual initiator contains at least one persulfate and at least one thiosulfate.

28. A cured polysilazoxane composition according to claim 27, wherein said heat curing temperature is from about 200° C. to about 300° C. and wherein said initiation curing temperature is from about 40° C. to about 250° C..

29. A cured polysilazoxane composition according to claim 28, wherein said free radical initiator is a peroxide initiator, an azo initiator, or combinations thereof.

30. A cured polysilazoxane composition according to claim 29, wherein the total amount of said initiators is from about 0.1 to about 10 percent by weight based upon the total weight of said polysilazoxane polymers and wherein said initiation cure temperature of said initiator cure is from about 40° C. to about 200° C.

31. A cured polysilazoxane composition according to claim 30, wherein the number average molecular weight (Mn) of said polysilazoxane is at least about 3,000, wherein $R^1$, $R^2$, $R^3$, and $R^4$ are independently alkyl groups containing from 1 to 2 carbon atoms, and wherein $R^a$, $R^b$, $R^c$, and $R^d$ are independently alkyl or alkenyl groups containing from 2 to 4 carbon atoms.

32. A cured polysilazoxane composition according to claim 31, wherein the amount of said initiator is from about 0.1 to about 6 percent by weight based upon the total weight of said polysilazoxane polymers.

33. A cured polysilazoxane composition according to claim 32, wherein said heat curing temperature is from about 225° C. to about 300° C. and wherein said initiator cure temperature is from about 45° C. to about 180° C.

34. A cured polysilazoxane composition according to claim 33, wherein said heat cure temperature is from about 250° C. to about 300° C., wherein said initiator cure temperature is from about 65° C. to about 130° C., wherein $R^a$, $R^b$, $R^c$, and $R^d$ are independently alkyl or alkenyl groups containing from 2 to 3 carbon atoms, wherein said polymerization occurs by hydrolytic polycondensation of the monomer in the absence of a dual initiator system, and wherein the water:monomer mole ratio is from about 1.5:1 to about 20:1.

35. A cured polysilazoxane composition according to claim 34, wherein the amount of said initiator is from about 0.1 to about 3 percent by weight based upon the total weight of said polysilazoxane polymers, and wherein said free radical initiator is azobisisobutyronitrile (AIBN) peroxide, dicumyl peroxide, t-butyl peroxide, or combinations thereof.

36. A process for curing polysilazoxane polymers, comprising the steps of:
forming the polysilazoxane polymers at a reaction temperature of from about 100° C. to about 190° C. with a number average molecular weight of about 3,000 to about 100,000, said polysilazoxane polymers prepared by the condensation polymerization of wherein $R^1$, $R^2$, $R^3$, and $R^4$ are independently alkyl groups containing from 1 to 4 carbon atoms, $R^a$, $R^b$, $R^c$, and $R^d$ are independently alkenyl or alkyl groups containing from 2 to 6 carbon atoms with the proviso that at least one of $R^a$, $R^b$, $R^c$, or $R^d$ group is an alkenyl group; and heat curing said polysilazoxane polymers at a temperature of about 200° C. to about 300° C. to crosslink said polymer; or optionally curing said polymer in the presence of a free radical initiator at a temperature of from about 40° C. to about 250° C.

37. A process according to claim 36, wherein said heat curing temperature is from about 200° to about 300° C., and optionally said initiator cure temperature is from about 40° C. to about 250° C.

38. A process according to claim 37, wherein said free radical initiator is a peroxide initiator, an azo initiator, or combinations thereof, wherein the total amount of said initiators is from about 0.1 to about 10 percent by weight based upon the total weight of said polysilazoxane polymers and wherein said initiator cure temperature is from about 40° C. to about 200° C.

39. A process according to claim 38, wherein the number average molecular weight (Mn) of said polysilazoxane is at least about 3,000, wherein $R^1$, $R^2$, $R^3$, and $R^4$ are independently alkyl groups containing from 1 to 2 carbon atoms, wherein $R^a$, $R^b$, $R^c$, and $R^d$ are independently alkyl or alkenyl groups containing from 2 to 4 carbon atoms, and wherein the amount of said initiator is from about 0.1 to about 6 percent by weight based upon the total weight of said polysilazoxane polymers.

40. A process according to claim 39, wherein said heat curing temperature is from about 225° C. to about 300° C., wherein said initiator cure temperature is from about 45° C. to about 180° C., wherein $R^a$, $R^b$, $R^c$, and $R^d$ are independently alkyl or alkenyl groups containing from 2 to 3 carbon atoms, wherein said polymerization occurs by controlled aqueous hydrolysis of the monomer, and wherein the water:monomer mole ratio is from about 1.5:1 to about 20:1.

41. A process according to claim 40, wherein the amount of said initiator is from about 0.1 to about 3 percent by weight based upon the total weight of said polysilazoxane polymers, and wherein said free radical initiator is azobisisobutylonitrile (AIBN), benzoyl peroxide, dicumyl peroxide, t-butyl peroxide, or combinations thereof.

* * * * *